Jan. 14, 1941.　　　E. OSTMAN　　　2,228,399
CHAIN FASTENER
Filed Feb. 14, 1940　　　2 Sheets-Sheet 1
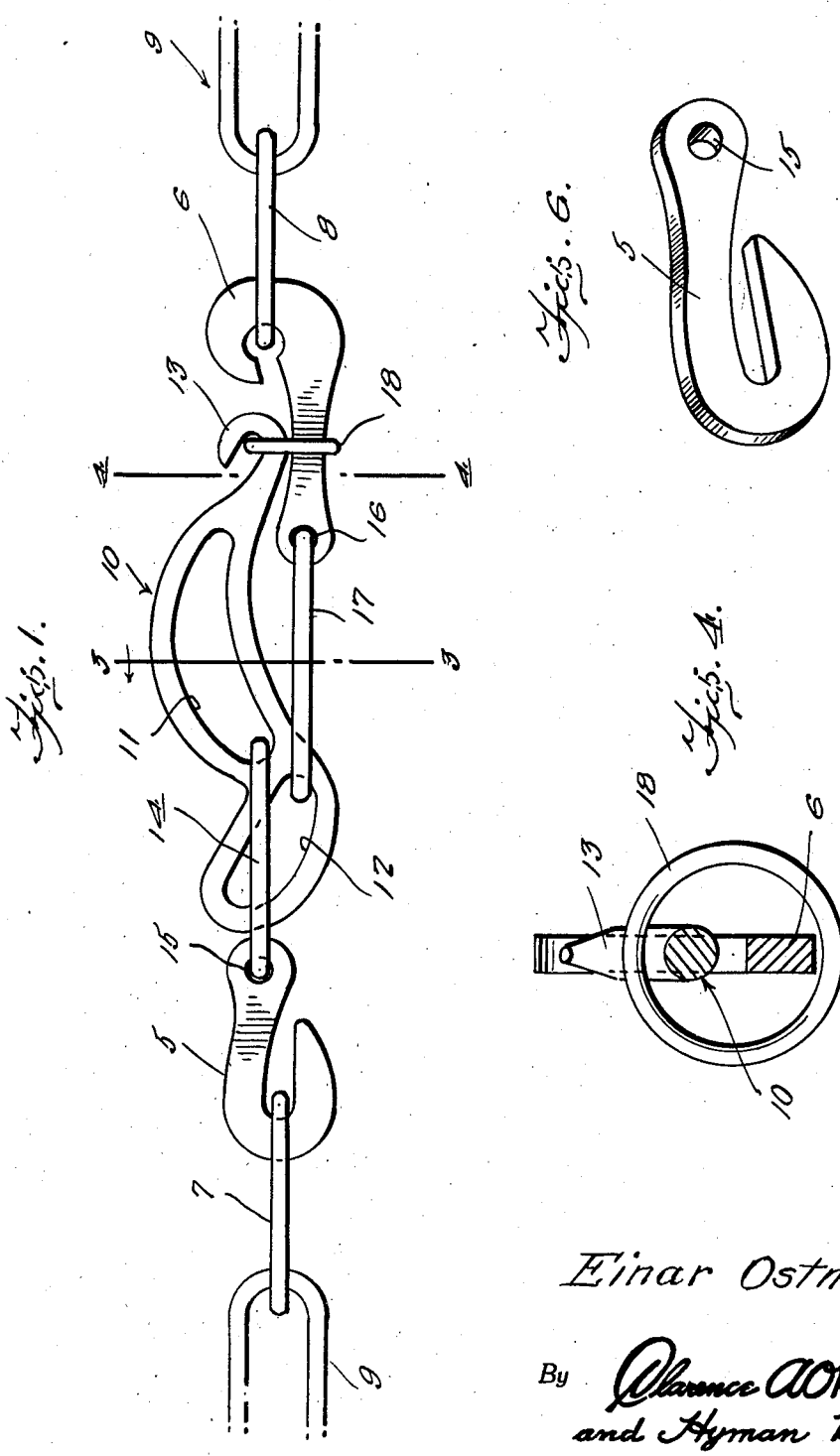
Inventor
Einar Ostman
By Clarence A. O'Brien
and Hyman Berman
Attorneys Jan. 14, 1941.  E. OSTMAN  2,228,399
CHAIN FASTENER
Filed Feb. 14, 1940  2 Sheets-Sheet 2
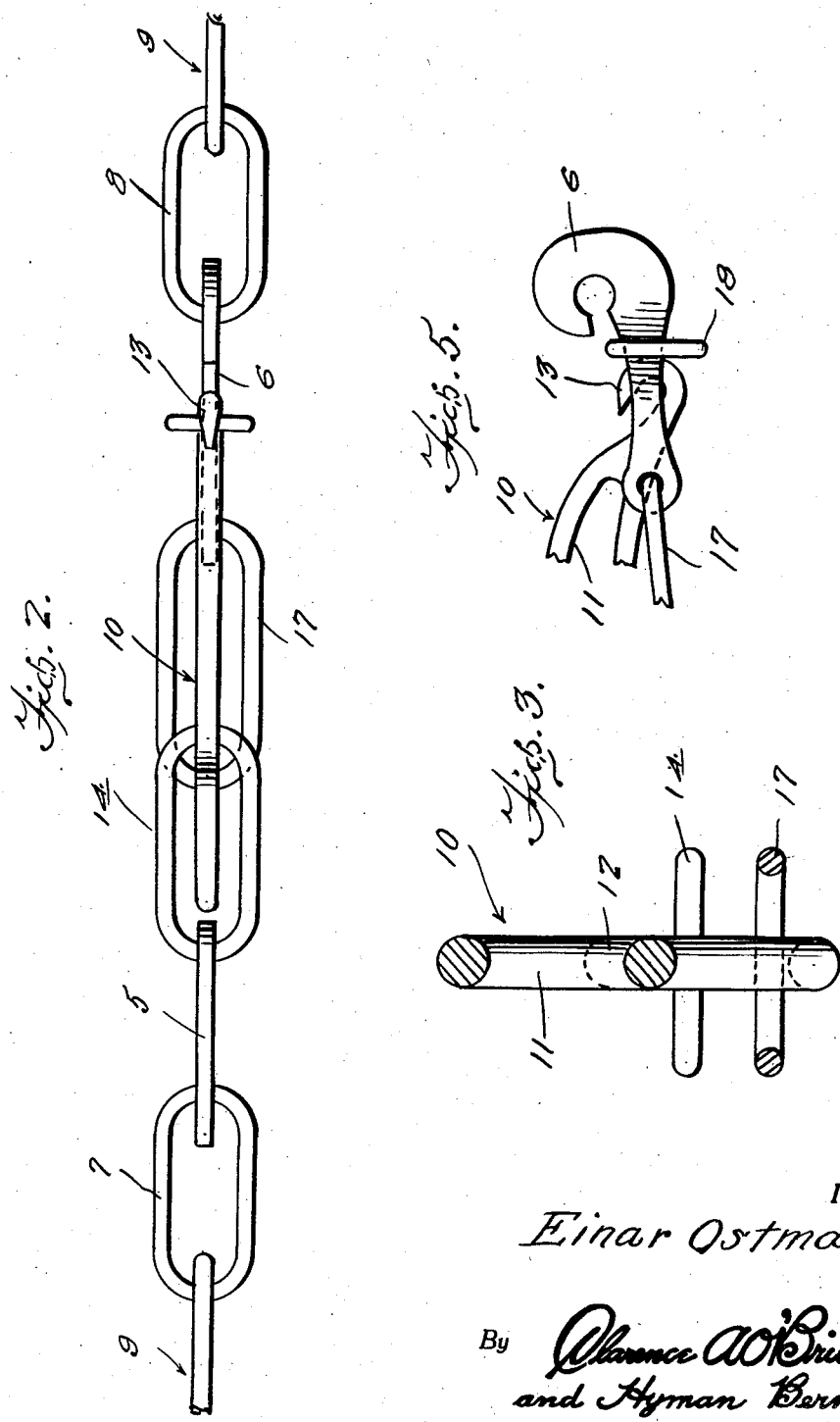
Inventor
Einar Ostman
By Clarence A. O'Brien
and Hyman Berman
Attorneys Patented Jan. 14, 1941

2,228,399

UNITED STATES PATENT OFFICE 2,228,399

CHAIN FASTENER

Einar Ostman, Laramie, Wyo.

Application February 14, 1940, Serial No. 318,923

4 Claims. (Cl. 24—68)

This invention relates to fastening devices and more particularly to fastening devices of the type particularly designed for fastening or connecting together the ends of a chain.

An object of the present invention is to provide a fastener of this character particularly designed for fastening the ends of the side chains of an automobile anti-skid chain or device.

Further it is an object of the invention to improve generally upon such chain fasteners as now known and used.

The invention together with its objects and advantages will be best understood from a study of the following description taken in connection with the accompanying drawings wherein:

Figure 1 is a side elevational view illustrating the application of the invention.

Figure 2 is a top plan view.

Figures 3 and 4 are detail sectional views taken substantially on the lines 3—3 and 4—4, respectively, of Figure 1.

Figure 5 is a fragmentary elevational view showing the lever of the fastener released, and Figure 6 is a perspective view of a hook forming part of the invention.

Referring more in detail to the drawings it will be seen that in the preferred embodiment thereof the fastener comprises a pair of hooks 5 and 6. Preferably the hooks are reversely positioned as shown in Figure 1, that is to say with the bill of one hook disposed in one direction and the bill of the other hook disposed in an opposite direction.

The hooks 5 and 6 are adapted to engage the end links 7 and 8 of the chain, fragmentarily shown and indicated generally by the reference numeral 9.

Further the fastener embodies a lever indicated generally by the reference numeral 10.

The lever 10 may be formed from any suitable material cut, shaped and dimensioned to provide a lever of irregular edge contour as shown and presenting angularly related long and short slots 11 and 12, and an integral terminal hook 13.

The chain-engaging hook 5 is connected loosely with the lever 10 through the medium of a loop or link member 14 that engages in an eye 15 provided on the free end of the shank of the hook 5 and the aforementioned slot 11 of the lever 10.

The hook 6 is loosely connected with the lever 10 through the medium of a link or loop member 17 that engages an eye 16 provided at the free extremity of the shank of hook 6 and the slot 12 of the lever 10.

Loosely engaged with the shank of the hook 6 is a retaining ring 18 with which the hook 13 of the lever 10 is engaged as shown in Figure 1 for securing the fastener in a chain-tightening position or, in other words, with the ends of the chain positively connected together through the medium of the fastener.

As will be noted, the hooks 5 and 6 differ somewhat in construction, the hook 5 being relatively small with a long bill to provide an entrance slot for the hook while the hook 6 is relatively larger with the head thereof substantially ovate and shaped so that the bill thereof forms with the head a substantially circular opening having a short re-entrance slot so there will be less likelihood of this hook 6 becoming disengaged from its link 8 of the chain 9.

In use the hooks 5 and 6 are engaged with the respective chain links 7 and 8 and the lever 10 then swung in a substantially clockwise direction to substantially the position shown in Figure 5. With the lever in this position the retainer or keeper ring 8 may then be slid over the hook end 13 of the lever so as to engage with said hook as the lever is permitted to move to the final fastening position shown in Figure 1. Obviously with the parts arranged as shown in Figure 1, the fastener will serve to positively connect the ends of the chain 9 together.

The manner of unfastening the chain is substantially reverse to that above described with regard to the positioning of the parts in a chain-connecting or fastening position and, it is believed, need not be described in detail.

It is thought that a clear understanding of the construction, utility and advantages of a chain fastener embodying the features of the present invention will be had without a more detailed description thereof.

Having thus described the invention what is claimed as new is:

1. A chain fastener of the character described comprising a pair of hooks respectively adapted to be engaged with the end links of a chain, a lever provided with a pair of slots and an integral hook at one end of the lever, link members engaging said slots and connecting said hooks with said lever, and a retainer ring loosely embracing the shank of one of said hooks and engageable with the hook of said lever for releasably securing the fastener in a chain fastening condition.

2. In a chain fastener of the character described, a lever consisting substantially of two integral angularly related loop-like portions and an integral terminal hook, a pair of chain-engaging hooks, each of said hooks embodying a shank provided with an eye, a link member engaging in the eye of the shank of one of said hooks and one of the loop portions of said lever for connecting said one hook and lever together, a second link engaging in the eye of the other of said hooks and in the second loop portion of said lever and connecting said second hook with said lever, and a retaining ring for the fastener loosely engaged on the shank of one of said chain-engaging hooks and engageable with the hook of said lever for retaining said fastener in a chain-fastening condition.

3. A chain fastener comprising a lever of irregular edge contour and provided with angularly related slots, and an integral terminal hook, a pair of chain-engaging hooks, links engaging said chain-engaging hooks and said slots for connecting the chain-engaging hooks loosely with said lever, and a member loosely engaged on one of said chain-engaging hooks and engageable with the hook of said lever for securing said chain fastener in a chain-fastening condition.

4. In a chain fastener of the character described, a lever consisting substantially of two integral angularly related loop-like portions and an integral terminal hook, a pair of chain-engaging hooks, each of said hooks embodying a shank provided with an eye, a link member engaging in the eye of the shank of one of said hooks and one of the loop portions of said lever for connecting said one hook and lever together, a second link engaging in the eye of the other of said hooks and in the second loop portion of said lever and connecting said second hook with said lever, and a retaining ring for the fastener swingable on the shanks of one of said chain-engaging hooks and for engagement with the hooks of said lever for retaining said fastener in a chain-fastening condition.

EINAR OSTMAN.